UNITED STATES PATENT OFFICE.

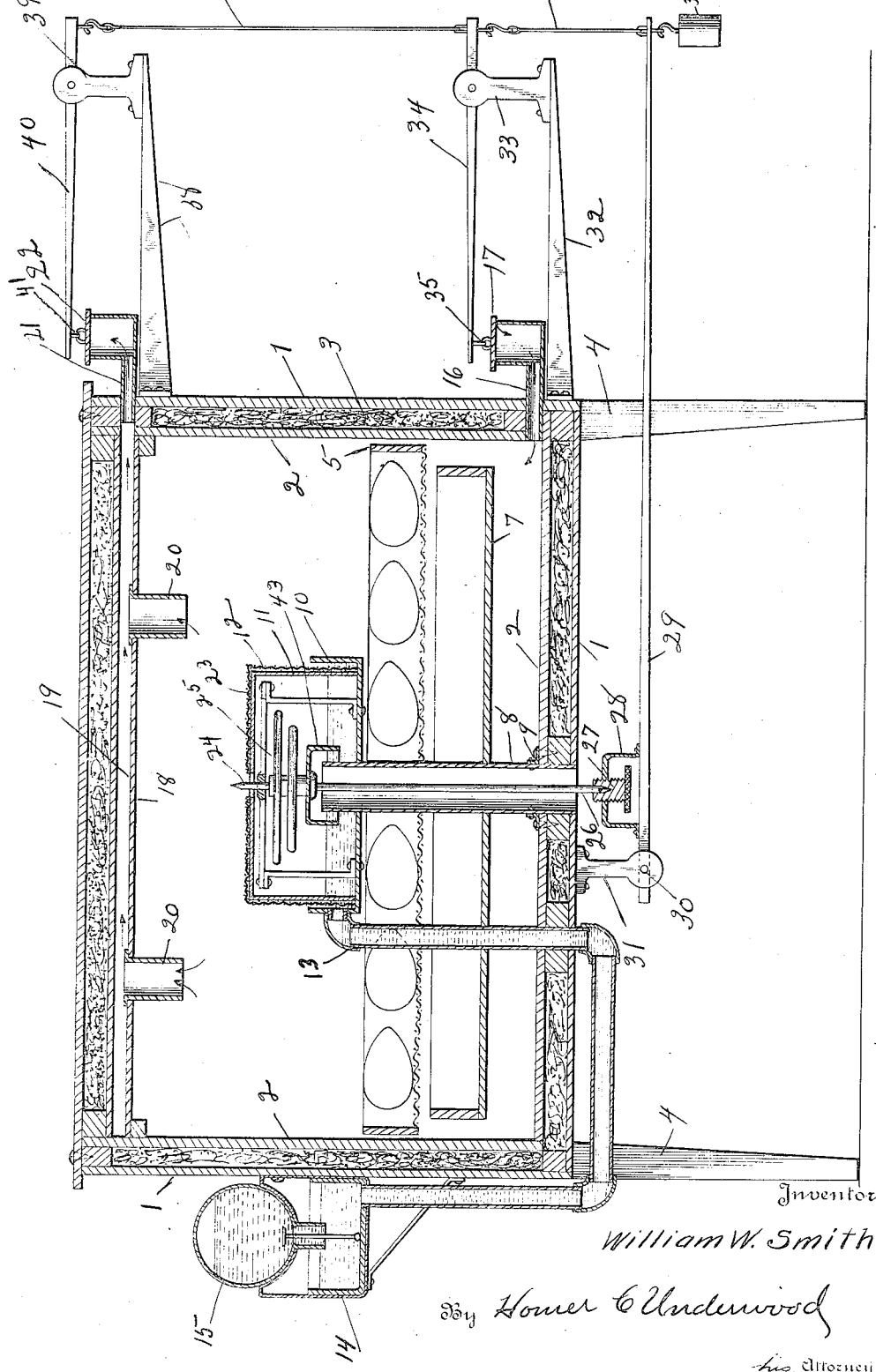

WILLIAM W. SMITH, OF HAWTHORNE, CALIFORNIA.

AUTOMATIC MOISTURE AND VENTILATION REGULATOR FOR INCUBATORS.

1,224,336.  Specification of Letters Patent.  Patented May 1, 1917.

Application filed May 1, 1916. Serial No. 94,723.

*To all whom it may concern:*

Be it known that I, WILLIAM W. SMITH, a citizen of the United States, and a resident of the town of Hawthorne, county of Los Angeles, State of California, have invented certain new and useful Improvements in Automatic Moisture and Ventilation Regulators for Incubators, of which the following is a specification.

This invention relates to improvements in automatic moisture and ventilation regulators for incubators. I have found that in order to secure the best results with an incubator, not only should the temperature be controlled, but the air should always contain a certain amount of moisture, and the amount of moisture in the air should be regulated and controlled so as to keep the conditions constant.

The object of my invention is to provide a supply of water in an incubator, so as to charge the air in the same with a proper amount of moisture and to provide air inlets thereto, said dampers being thermostatically governed so that when the air in the incubator becomes too hot, the thermostat is actuated to open the dampers and admit fresh air, which absorbs moisture from the water supply until the proper condition of moist atmosphere is attained.

Further objects, and objects relating to economies of operation and details of construction will definitely appear from the detailed description following.

I accomplish the objects of my invention by the devices and means described, herein. The invention is clearly defined and pointed out in the claims.

A structure, which is preferred embodiment of my invention, is clearly illustrated in the accompanying drawing in which the figure is a vertical, sectional view through an incubator embodying my invention.

In the drawing, similar reference numerals refer to similar parts.

The incubator is provided with outer walls, 1, inner walls, 2; and a layer of heat insulating material, 3, disposed between the outer and inner walls. The incubator is mounted on the legs 4, the egg-tray 5 provided with a wire screen bottom 6, removably supported within the incubator. A second drawer 7, is provided below the first drawer as shown in the drawing. The incubator is heated in the customary manner known in the art. A tube or cylinder 8, extends through the bottom of the incubator and is supported therein by a flanged collar 9. A pan 10 is secured to and carried by the upper end of this cylinder as shown in the drawings. A cylindrical wire frame, 11, is supported in the pan 10, this frame being covered with a knitted cloth or other suitable fabric, 12. Water is maintained at a constant level in the pan 10, by means of a pipe 13 which connects said pan with a tank 14 carried on the outside of the incubator, the water in said tank 14 being supplied from the tank 15. The upper end of the cylinder 8 is located above the water level in the pan 10 so that the water will not flow from the pan 10 through the cylinder 8. Air enters the incubator through the passage 16 adjacent the bottom of the incubator, said inlet passage being controlled by the damper 17. A false partition wall, 18, extends across the top of the incubator forming a passage 19, between said partition wall and the top of the incubator. Depending pipes 20, are carried by said partition wall and open into said passage 19 which connects at one end with the outlet passage 21, said outlet passage being controlled by the damper 22. Air enters the incubator through the passage 16, passes up through the incubator, where it is charged with moisture from the water supply in the pan 10, and passes out through the pipes 20, passage 19 and outlet 21.

I have provided means whereby when the incubator becomes too hot, the dampers 17 and 20 will be opened admitting fresh air and allowing the heated air to pass out. This permits of the accurate control of the temperature in the incubator and at the same time the air is always moist. A frame 23 is supported in the pan 10 and a pin 24 is centrally carried by said frame 23, one end of said pin being connected to the upper part of the thermostat 25, while the lower part of the thermostat is connected with the rod 26, which extends downwardly through the cylinder 8 and is fastened in a screw plug 27, which is adjustably carried by a bracket 28. The bracket 28 is fastened on a lever 29, which is pivoted at 30 in a hanger 31 secured to the bottom of the incubator. An arm 32 carried by the side of the incubator has a bracket 33 at the end thereof on which the lever 34 is fulcrumed. One end of said lever 34 is connected at 35 to the damper 17, while the other end of said lever 34 is connected by link 36 with the free end of lever 29. A counterbalance weight 37 is also carried by the free end of said lever 29. A second arm 38 is supported by the side of the incubator near the top and carries a bracket 39 on which the lever 40 is fulcrumed, one end of said lever 40 being connected with the damper 22 at 41, while the other end of said lever is connected by a link 42 with the corresponding end of the lever 34. A sealing bell 43 is carried by the rod 26 above the end of the cylinder 8, the lower edge of said bell being below the surface of the water in the pan 10, so that no air can pass into the incubator through the cylinder 8.

From the description of the parts given above, the operation of this device should be very readily understood. When the air in the incubator becomes heated it acts upon the thermostat 25, causing the same to expand. The result of this action is to force the rod 26 downwardly, which swings the lever 29 on its pivot 30 and pulls down on the links 36 and 42, actuating the levers 34 and 40, and lifting the dampers 17 and 22 so as to open the inlet and outlet passages. The weight 37 counterbalances the weight of the dampers 17 and 22 so as to facilitate the action of the levers. The connection between the rod 26 and the lever 29 is variable since the screw plug 27 is adjustable in the bracket 28. By turning this screw plug 27 the dampers may be made to open at any desired temperature. A supply of water is maintained at a constant level in the pan 10 from the supply tank 14 and the cloth covering 12 absorbs this water by capillary action and presents a wet surface to the action of the air so that it may be charged with moisture more readily.

I am aware that the particular embodiment of my invention, which I have here shown and described, may be changed considerably without departing from the spirit of my invention, and therefore, I do not wish to be restricted to the same except as required by the appended claims. I have found, however, that this particular embodiment is desirable from many standpoints and, therefore, I wish to claim the same specifically as well as broadly.

Having thus described my invention, what I claim as new and desire to secure by Letters Patent is—

1. In a device of the class described, the combination with an incubator of air inlet and outlet passages, dampers controlling said passages, a cylinder carried by and extending through the bottom of said incubator, a pan carried by the upper end of said cylinder, a pipe connecting said pan with a water supply, a wire frame supported in said pan, a fabric covering for said wire frame, a thermostat supporting frame carried by said pan, a thermostat having one part thereof connected to said supporting frame, the other part of said thermostat being connected to a rod, extending downwardly through said cylinder, a suitably fulcrumed lever, a bracket carried thereby, a screw plug adjustable in said bracket to which the lower end of said rod is connected and connections between said lever and said dampers whereby said dampers are actuated by the movement of said lever.

2. In a device of the class described, the combination of an incubator provided with air inlet and outlet passages, dampers controlling said passages, a cylinder carried by and extending through the bottom of said incubator, a pan carried by the upper end of said cylinder, means for supplying water to said pan, a frame supported in said pan, a fabric covering on said frame, a thermostat having its upper part fixedly supported between the said covering and said pan, a rod extending downwardly through said cylinder and connected at its upper end to the lower part of said thermostat, a suitably fulcrumed lever, a plug carried by said lever and adjustable with reference thereto, the lower end of said rod being connected to said plug, and connections between said lever and said dampers whereby said dampers are actuated by the movement of said lever.

3. In a device of the class described, the combination of an incubator provided with air inlet and outlet passages, dampers controlling said passages, a pan supported within said incubator, means for supplying water to said pan, a frame supported in said pan, a fabric covering for said frame having a portion extending into the water in said pan, a thermostat disposed between said fabric covering and said pan, a rod connected to the movable part of said thermostat, a suitably fulcrumed lever, the lower end of said rod being adjustably connected to said lever, and connections between said lever and said dampers whereby said dampers are actuated by the movement of said lever.

In testimony whereof I affix my signature in presence of two witnesses.

WILLIAM W. SMITH.

Witnesses:
MINNIE A. SMITH,
JOHN C. KINMAN.